Oct. 15, 1963  S. L. RIDGWAY  3,106,821
AUTOMOBILE ENGINE EXHAUST SYSTEM
Filed Nov. 7, 1960
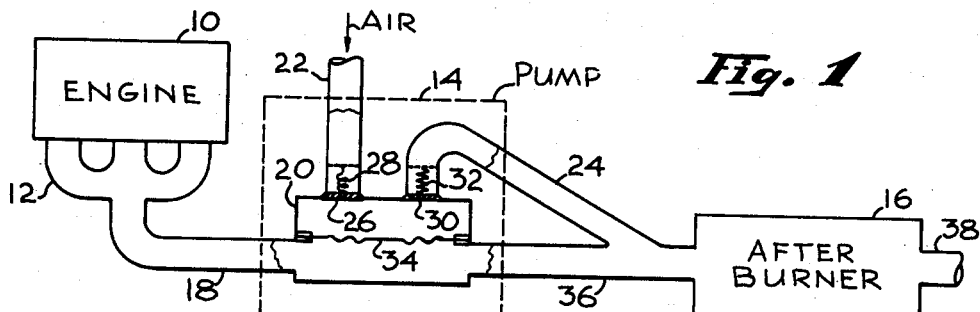
Fig. 1
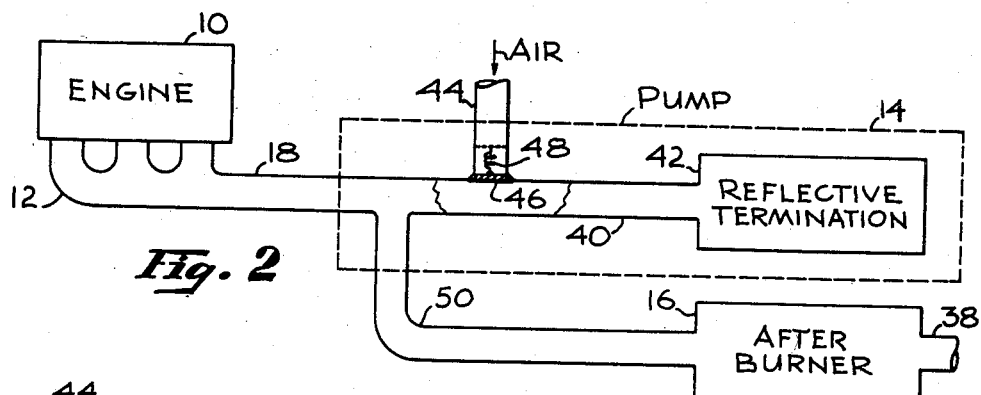
Fig. 2
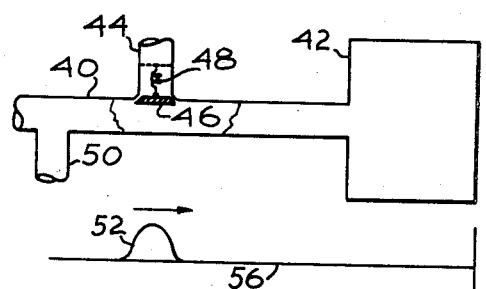
Fig. 3
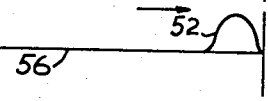
Fig. 3(a)
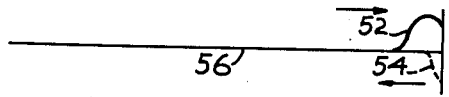
Fig. 3(b)
Fig. 3(c)
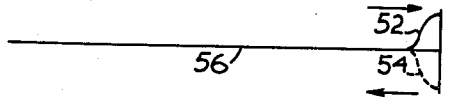
Fig. 3(d)
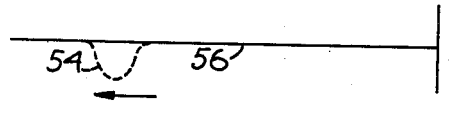
Fig. 3(e)
Stuart L. Ridgway
INVENTOR.
BY George C. Thompson
agent United States Patent Office 3,106,821
Patented Oct. 15, 1963

3,106,821
AUTOMOBILE ENGINE EXHAUST SYSTEM
Stuart L. Ridgway, Topanga, Calif., assignor to Thompson Ramo Wooldridge Inc., Canoga Park, Calif., a corporation of Ohio
Filed Nov. 7, 1960, Ser. No. 67,584
5 Claims. (Cl. 60—30)

This invention relates to controllable air supply systems and more specifically to a novel pressure pulse actuated air pump particularly useful in internal combustion engine exhaust systems.

In many sections of the country there exists a problem of air pollution caused in part by contaminants present in exhaust fumes which emanate from internal combustion engines. One suggested method of solving this air pollution problem has been the utilization of devices commonly termed afterburners in the exhaust systems of internal combustion engines to oxidize the contaminants, thereby producing substantially clean exhaust. In such exhaust systems, the amount of air supplied to the afterburner is of particular importance for if too little air is supplied, incomplete oxidation of the contaminants will result, while if too large an amount of air is supplied, the operating temperature of the afterburner may be lowered, thereby decreasing the efficiency of the afterburner. Since the amount of contaminants produced by an internal combustion engine is proportional to the amount of exhaust, the amount of air required to oxidize the contaminants is proportional to the amount of exhaust supplied to the afterburner. Further, the amount of exhaust supplied to the afterburner is a function of the speed at which the engine is operating. Accordingly, in the past, pump devices have been provided between the engine and the afterburner to deliver air to the afterburner. These pumps have been separate devices which, to provide air in proportion to the amount of exhaust applied to the after burner, have been connected to and driven by the crankshaft of the engine. The supply of air to the afterburner in such a manner, however, takes an appreciable amount of power from the crankshaft, thereby lowering engine efficiency. Further, due to the limited space available in some engine compartments, it is extremely difficult to find mounting space for such pump devices.

Accordingly, it is an object of the present invention to provide a simple pump device which will supply air to an afterburner in proportion to the amount of exhaust received thereby and which does not require a direct drive coupling from the engine.

It is another object of the present invention to provide a simple and economical air pump for use in exhaust systems which does not require appreciable mounting space in the engine compartment.

In the operation of an internal combustion engine an opening of the exhaust valves of the engine causes highly compressed exhaust gases present in the cylinders of the engine to be released to the exhaust manifold. These compressed exhaust gases expand violently into the exhaust manifold creating the noise for which mufflers are generally provided.

In the present invention the above objects are realized by use of the discovery that pressure fluctuations (pressure pulses) caused by this violent expansion of exhaust gases into the exhaust manifold are sufficiently large, relative to back pressures of an afterburner, to be utilized in pumping air to the afterburner. It was further found that the exhaust pressure pulses of an internal combustion engine vary in frequency in proportion to the amount of exhaust released from the engine. Thus, means utilizing the pressure pulses may be developed which will deliver air to the afterburner in direct proportion to the amount of exhaust released by the engine. Accordingly, in a basic form, the present invention as utilized in an internal combustion engine exhaust system, includes a pressure pulse actuated air pump positioned to receive pressure pulses developed by the internal combustion engine and to deliver proportional amounts of air to an afterburner.

More specifically, in a basic form of the present invention, the pressure pulse actuated air pump includes a chamber for receiving frequency variable pressure pulses such as those developed in the exhaust of an internal combustion engine. To supply air to the chamber, an air intake means is provided in the chamber. Likewise to release air from the chamber, an air output means is also provided. To then draw air into and out of the chamber in proportion to the frequency of the pressure pulses applied to the pump, a means movable in response to the pressure pulses is connected across the air intake means of the chamber.

Thus, in accordance with the above objects, the present invention, when utilized in an internal combustion engine exhaust system, provides means for pumping air to an afterburner in proportion to the amount of exhaust received thereby and does not necessitate a direct power coupling with the engine. Further, since the invention is driven by pressure pulses from the engine, it may be placed between the exhaust manifold and afterburner, thereby necessitating a minimum amount of mounting space.

In addition to the above, other objects and features of the present invention may be more clearly understood by reference to the following detailed description when considered with the drawings, in which:

FIG. 1 is a diagrammatic representation of a basic form of the present invention as utilized in an internal combustion engine system;

FIG. 2 is a diagrammatic representation of another form of the present invention as utilized in an internal combustion engine exhaust system;

FIG. 3 is a diagrammatic representation of the present invention as illustrated in FIG. 2; and FIGS. 3a through 3e illustrate in graphical form the propagation of a pressure pulse in the embodiment of the invention represented in FIG. 3.

Referring to FIG. 1, there is illustrated an exhaust system for an internal combustion engine, the latter being represented by rectangle 10. As shown, the exhaust system includes an exhaust manifold 12, an air pump 14, and an afterburner 16. Thus exhaust gases developed by engine 10 will flow through means represented by exhaust pipe 18 to air pump 14 and hence to afterburner 16. At air pump 14, the pressure fluctuations (pressure pulses) in the exhaust gases cause air to be pumped to afterburner 16 in proportion to the frequency of the pressure pulses. More particularly, air pump 14 comprises a chamber 20 having an air intake means 22 and an air output means 24. As represented, the admission of air to chamber 20 is controlled by a valve arrangement 26 connected across air intake means 22. Valve arrangement 26 is normally closed as represented by spring 28, thereby normally preventing air from entering chamber 20. In a like manner, the release of air from chamber 20 is controlled by a valve arrangement 30 connected across air output means 24. As represented by spring 32, valve arrangement 30 is normally closed, thereby preventing air from normally escaping from the chamber.

As shown in FIG. 1, chamber 20 is divided into two compartments, one compartment receiving exhaust gases from exhaust manifold 12 and the second compartment receiving air from air intake means 22. To control the operation of valves 26 and 30 such that air is drawn into and released from chamber 20 in proportion to the amount of exhaust developed by engine 10, chamber 20 is divided by a flexible diaphragm 34. Diaphragm 34 is fixedly attached to chamber 20 as to prevent exhaust gases from entering the second portion of chamber 20. Accordingly, in operation, a pressure pulse received by air pump 14 will cause the upward deflection of diaphragm 34, thereby maintaining valve 26 in its normally closed position but opening valve 30. Upon the passage of this pressure pulse from chamber 20 a downward deflection of diaphragm 34 will occur, thereby opening valve 26 and closing valve 30. The opening of valve 26 causes air to flow from air intake means 22 into the second portion of chamber 20. When diaphragm 34 is again deflected in an upward direction, as by another pressure pulse, valve 26 will close and valve 30 will open. This opening of valve 30 will release air through air output means 24 to continue with the exhaust gases at tube 36 prior to entry into afterburner 16.

Thus, in the embodiment of the present invention, as represented in FIG. 1, exhaust pressure pulses developed by engine 10 and applied to air pump 14 causes air to be supplied to afterburner 16 in proportion to the mount of exhaust developed by engine 10. This supply of air to afterburner 16 will allow substantially complete combustion of the contaminants present in the exhaust, thereby producing substantially clean exhaust at output 38 of afterburner 16.

Referring now to FIG. 2, there is illustrated another form of the present invention as utilized in an internal combustion engine exhaust system. As shown, the exhaust system includes exhaust manifold 12, air pump 14 and afterburner 16. Thus, as in the discussion of FIG. 1, exhaust gases developed by engine 10 flow through means 18 to pump 14 and hence to afterburner 16. At pump 14 the pressure fluctuations in the exhaust gases will again cause air to be pumped to afterburner 16 in proportion to the frequency of the pressure fluctuations. As represented in FIG. 2, however, this embodiment of the invention does not require a flexible diaphragm for operation as did the embodiment of FIG. 1.

As illustrated in FIG. 2, air pump 14 includes a tubular chamber such as a tube 40 one end of which is connected to exhaust pipe 18 to receive the exhaust pressure pulses from engine 10. The other end of tube 40 has a termination 42. As illustrated, termination 42 is a cavity having a volume which is of a substantial magnitude relative to the volume of tube 40. For example, cavity 42 may be of a volume which is ten times the volume of tube 40. This volume ratio insures that termination 42 is a reflective termination.

As is further illustrated by FIG. 2, to supply air to pump 14, air intake means 44 is provided. To control the intake of air by pump 14, a valve arrangement 46 is included between tube 40 and air intake means 44. As represented by spring 48, valve arrangement 46 is normally closed, thereby normally preventing air from entering pump 14. Further, to release air as well as exhaust gases from pump 14 to afterburner 16, an output 50 is provided.

In operation, an exhaust pressure pulse developed by engine 10, when received by pump 14, will propagate down tube 40 to reflective termination 42. At termination 42, a reflected pressure pulse is developed which then propagates in the direction of output 50. During the propagation of the reflected pressure pulses in tube 40, air is drawn into tube 40 and is transported to output 50, thereby supplying air to afterburner 16 in proportion to the amount of exhaust gases developed by engine 10.

More specifically, due to the volume ratio between reflective termination 42 and tube 40, the pressure within termination 42 may be considered to remain at a substantially constant pressure regardless of pressure pulses applied thereto—this substantially constant pressure being the mean pressure of the exhaust system which is inherently above atmospheric pressure. In other words, in this embodiment of the present invention, a termination is provided having a boundary condition which is the mean pressure of the exhaust system. Thus, a pressure pulse having a pressure greater than the mean pressure of the system will be reflected by termination 42 as a pressure pulse having a pressure less than the mean pressure of the system, thereby maintaining the substantially constant pressure boundary condition of the termination.

In accordance with the above, in the embodiment of the present invention illustrated in FIG. 2, an exhaust pressure pulse received by pump 14 will propagate down tube 40. The pressure pulse in the area of valve 46 will maintain valve 46 in its normally closed position. Since the boundary condition of the termination is that the pressure shall remain at the mean pressure of the system, the pressure pulse, upon being received by termination 42, is converted into velocity energy. This velocity energy is reconverted into a pressure pulse having a pressure less than the mean pressure of the system propagating in the direction of output 50. In other words, since the pressure at termination 42 must remain constant, a reflected pulse is created whose pressure behavior substantially neutralizes the incident pressure pulse at the boundary of termination 42. In the vicinity of valve 46, this reflected pressure pulse will cause valve 46 to open, thereby drawing air into tube 40 and hence to output 50.

The above described mode of operation may be more clearly understood by reference to FIG. 3 and FIGS. 3a through 3e. FIG. 3 represents in diagrammatic form the embodiment of the present invention illustrated in FIG. 2. FIGS. 3a through 3e represent the propagation of a pressure pulse in tube 40 and termination 42, thereby illustrating in graphical form the manner of formation of the reflected pressure pulse. More particularly, at one instant of time, as represented by FIG. 3a, an incident pressure pulse 52 will be in the vicinity of valve 46. This pressure pulse will maintain valve 46 in its normally closed position. At a later instant of time, as represented by FIG. 3b, incident pressure pulse 52 will impinge upon the boundary of termination 42. Due to the boundary condition of termination 42, as represented in FIG. 3c the incident pressure pulse impinging upon the boundary of termination 42 will develop a reflected pressure pulse 54 which relative to the mean pressure of the system, as represented by line 56, is of opposite magnitude to that of incident pressure pulse 52. As represented in FIG. 3d, reflected pressure pulse 54 cancels the increase in pressure which would normally be caused at termination 42 by incident pulse 52. As is illustrated by FIG. 3e, reflected pressure pulse 54 then propagates in tube 40 in the direction of output 50. Then, as previously mentioned, the reflected pressure pulse, such as 54 represented in FIG. 3e, being of a magnitude less than the mean pressure of the system when in the vicinity of valve 46, will cause valve 46 to open, thereby emitting air to tube 40 which in turn passes out of tube 40 at output 50.

Thus in the embodiment of the present invention, as represented in FIG. 2, pressure pulses developed by engine 10 and applied to air pump 14 cause air to supply to afterburner 16 in proportion to the amount of exhaust gas developed by engine 10.

In considering the embodiment of the present invention illustrated in FIGS. 2 and 3, it is to be noted, however, that the length of tube 40 should be such that each pressure pulse received by pump 14 will traverse tube 40 prior to the entry of the next pressure pulse. This will eliminate any possible interaction between incident and reflected pressure pulses, thereby insuring that the magnitude of air supplied to afterburner 16 will be proportional to the amount of exhaust developed by engine 10. For example, pressure pulses developed by an eight cylinder internal combustion engine operating at 3600 r.p.m. will travel approximately ten feet per engine cycle. Accordingly, when using the embodiment of the present invention illustrated in FIGS. 2 and 3 with an internal combustion engine capable of operating at 3600 r.p.m. tube 40 should be approximately five feet in length.

Although the present invention has been described as being particularly useful in supplying air for internal combustion engine exhaust systems, it is understood that this is merely by way of example and not limiting upon the invention or its scope of use.

Having defined the invention, what is claimed is:

1. In an automobile exhaust system including an exhaust manifold and afterburner, an air pump operatively connected to said exhaust manifold and said afterburner, said pump being actuated by frequency variable exhaust pressure pulses developed in said exhaust manifold and comprising in combination: input means connected to said exhaust manifold for receiving said exhaust pressure pulses; a chamber connected to said input means and including an air intake means for supplying air to said chamber and air output means for releasing air from said chamber to said afterburner; and means within said chamber responsive to said pressure pulses for expelling said air from said chamber to said afterburner in proportion to the frequency of said pressure pulses.

2. The combination defined by claim 1, wherein said last-named means comprises flexible diaphragm means fixedly mounted in said chamber and separating said chamber into two portions.

3. The combination defined by claim 1, wherein said last-named means comprises a flexible diaphragm fixedly mounted in said chamber and separating said chamber into two portions, one of which is connected to said air intake means and said air output means, the other of which is connected to said input means.

4. The combination defined by claim 1, wherein said last-named means comprises a reflective termination in said chamber.

5. The combination defined by claim 1, wherein said last-named means comprises a reflective termination in said chamber and said air intake means comprises a tube having pressure responsive valve means connected thereacross.

References Cited in the file of this patent
UNITED STATES PATENTS

| | | |
|---|---|---|
| 2,381,594 | Holthouse | Aug. 7, 1945 |
| 2,602,291 | Farnell | July 8, 1952 |
| 2,629,983 | Anderson | Mar. 3, 1953 |
| 2,796,735 | Bodine | June 25, 1957 |
| 2,811,425 | Houdry | Oct. 29, 1957 |
| 2,871,789 | Kiffer et al. | Feb. 3, 1959 |
| 2,920,572 | Schaurte | Jan. 12, 1960 |
| 2,937,490 | Calvert | May 24, 1960 |